(12) United States Patent
Shin

(10) Patent No.: US 11,390,266 B2
(45) Date of Patent: Jul. 19, 2022

(54) MOTOR TORQUE CONTROL APPARATUS FOR HYBRID VEHICLE, MOTOR TORQUE CONTROL METHOD OF THE SAME, AND HYBRID VEHICLE INCLUDING THE SAME

(71) Applicants: HYUNDAI MOTOR COMPANY, Seoul (KR); KIA MOTORS CORPORATION, Seoul (KR)

(72) Inventor: Hong Chul Shin, Gwangmyeong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 371 days.

(21) Appl. No.: 16/746,125

(22) Filed: Jan. 17, 2020

(65) Prior Publication Data

US 2021/0061256 A1 Mar. 4, 2021

(30) Foreign Application Priority Data

Aug. 30, 2019 (KR) .......................... 10-2019-0107116

(51) Int. Cl.
*B60W 20/15* (2016.01)
*B60W 30/20* (2006.01)
*B60K 6/26* (2007.10)

(52) U.S. Cl.
CPC ............ *B60W 20/15* (2016.01); *B60W 30/20* (2013.01); *B60K 6/26* (2013.01); *B60W 2510/081* (2013.01); *B60W 2510/1005* (2013.01); *B60W 2540/10* (2013.01); *B60W 2710/081* (2013.01); *B60W 2710/083* (2013.01); *B60Y 2200/92* (2013.01)

(58) Field of Classification Search
None
See application file for complete search history.

(56) References Cited

U.S. PATENT DOCUMENTS

| 2014/0107877 A1* | 4/2014 | Bang .................... B60L 15/2045 701/22 |
| 2015/0253657 A1* | 9/2015 | Hajjar .................... G03B 21/58 359/461 |
| 2017/0072815 A1* | 3/2017 | Cho ....................... B60W 30/20 |

OTHER PUBLICATIONS

Scamarcio, A., et al. "Anti-jerk controllers for automotive applications: A review", 2020, Annual Reviews in Control, vol. 50, pp. 174-189. (Year: 2020).*

(Continued)

*Primary Examiner* — Genna M Mott
(74) *Attorney, Agent, or Firm* — Lempia Summerfield Katz LLC

(57) ABSTRACT

A motor torque control apparatus for a hybrid vehicle includes: a calculator for calculating a model speed of a motor, a control model speed, an anti-jerk torque, and an anti-jerk torque control factor; and a controller for controlling the calculator. At the time of LFU shifting, the controller controls a motor speed using the anti-jerk torque, determines whether the motor speed controlled using the anti-jerk torque is abnormal based on the maximum difference value between the motor speed and the model speed and a reduction in the motor speed, corrects the anti-jerk torque based on the control model speed and the anti-jerk torque control factor upon determining that the motor speed is abnormal, and controls the motor speed using the corrected anti-jerk torque.

20 Claims, 10 Drawing Sheets

(56) References Cited

OTHER PUBLICATIONS

X. Lu, H. Chen, H. Zhang, P. Wang and B. Gao, "Design of model predictive controller for anti-jerk during tip-in/out process of vehicles," Proceedings of the 30th Chinese Control Conference, 2011, pp. 3395-3400. (Year: 2011).*

* cited by examiner

MOTOR TORQUE CONTROL APPARATUS FOR HYBRID VEHICLE, MOTOR TORQUE CONTROL METHOD OF THE SAME, AND HYBRID VEHICLE INCLUDING THE SAME

This application claims priority to and the benefit of Korean Patent Application No. 10-2019-0107116, filed on Aug. 30, 2019, the entire contents of which are incorporated herein by reference.

FIELD

The present disclosure relates to a motor torque control apparatus for a hybrid vehicle, and more particularly to a motor torque control apparatus for a hybrid vehicle, a motor torque control method of the same, and a hybrid vehicle including the same for improving engine flare.

BACKGROUND he statements in this section merely provide background information related to the present disclosure and may not constitute prior art.

In general, lift-foot-up (LFU) shifting of a hybrid vehicle is a type of shifting in which a driver shifts to the gear stage appropriate for the current vehicle speed in a tip-out situation (e.g., a deceleration situation).

In a hybrid vehicle, as shown in FIG. 1, when LFU shifting control is started, a release hydraulic pressure of a valve body in a transmission is decreased, and an apply hydraulic pressure is finely controlled in a standby state, and then is increased when the motor RPM (revolutions per minute) reaches an actual shifting start RPM, thereby completing shifting control.

However, during LFU shifting in a hybrid vehicle, a surge in RPM may occur before/after actual shifting due to transmission hydraulic pressure control deviation and disturbance.

That is, in a hybrid vehicle, when the required torque is high due to wide-open throttle (WOT) operation and a tip-out operation is performed, RPM run-up may occur due to hydraulic pressure control deviation before the actual LFU shifting and disturbance.

Therefore, in a hybrid vehicle, RPM run-up due to hydraulic pressure control deviation and disturbance may be reduced using anti-jerk torque (AJ TQ) of the motor.

As shown in FIG. 2, the motor outputs negative (−) torque at an initial stage in order to control run-up. However, until the motor speed reaches a model speed, differential variation has a negative (−) value, and thus the motor outputs positive (+) torque.

At this time, because the motor outputs positive (+) torque, the actual torque that is output is greater than the required torque. We have discovered that this may have an adverse effect until the motor/engine speed reaches a reference speed at which actual LFU shifting is started. That is, in a hybrid vehicle, engine flare may occur because the motor torque is excessively output in order to prevent run-up before actual LFU shifting.

SUMMARY

The present disclosure is directed to a motor torque control apparatus for a hybrid vehicle, a motor torque control method of the same, and a hybrid vehicle including the same that substantially obviate one or more problems due to the limitations and disadvantages of the related art.

The present disclosure provides a motor torque control apparatus for a hybrid vehicle, a motor torque control method of the same, and a hybrid vehicle including the same, in which, when run-up of a motor speed is controlled using anti-jerk torque, if engine flare occurs, the anti-jerk torque is corrected based on a flare control model speed and an anti-jerk torque flare control factor, thereby robustly and actively controlling motor torque in order to control run-up of a motor/engine speed during lift-foot-up (LFU) shifting in a hybrid vehicle.

Additional advantages, objects, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

In accordance with an aspect of the present disclosure, a motor torque control apparatus for a hybrid vehicle includes: a first calculator configured to calculate a model speed of a motor and a control model speed; a second calculator configured to calculate an anti-jerk torque of the motor and an anti-jerk torque control factor; a third calculator configured to calculate the maximum difference value between the model speed and a motor speed; a fourth calculator configured to calculate a reduction in the motor speed; and a controller configured to control the first calculator, the second calculator, the third calculator, and the fourth calculator. At the time of lift-foot-up (LFU) shifting, the controller may control the motor speed using the anti-jerk torque, may determine whether the motor speed controlled using the anti-jerk torque is abnormal based on the maximum difference value between the motor speed and the model speed and the reduction in the motor speed, may correct the anti-jerk torque based on the control model speed and the anti-jerk torque control factor upon determining that the motor speed is abnormal, and may control the motor speed using the corrected anti-jerk torque.

In accordance with another aspect of the present disclosure, there is provided a motor torque control method of a motor torque control apparatus for a hybrid vehicle including a calculator configured to calculate a model speed of a motor, a control model speed, an anti-jerk torque, and an anti-jerk torque control factor, and a controller configured to control the calculator. The motor torque control method may include: determining, by the controller, whether lift-foot-up (LFU) shifting is to be performed; upon determining that the LFU shifting is to be performed, determining, by the controller, whether a motor speed is higher than the model speed; upon determining that the motor speed is higher than the model speed, controlling, by the controller, the motor speed using the anti-jerk torque; controlling, by the controller, the calculator to calculate the maximum difference value between the model speed and the motor speed and a reduction in the motor speed; determining, by the controller, whether the motor speed is abnormal based on the maximum difference value between the model speed and the motor speed and the reduction in the motor speed; upon determining that the motor speed is abnormal, controlling, by the controller, the calculator to calculate the control model speed and the anti-jerk torque control factor; correcting, by the controller, the anti-jerk torque based on the control model speed and the anti-jerk torque control factor; and controlling, by the controller, the motor speed using the corrected anti-jerk torque.

In accordance with a further aspect of the present disclosure, a hybrid vehicle includes a hybrid power source including a motor and an engine, and a motor torque control apparatus configured to control a motor torque of the hybrid power source. At the time of lift-foot-up (LFU) shifting, the motor torque control apparatus may control a motor speed using an anti-jerk torque, may determine whether the motor speed controlled using the anti-jerk torque is abnormal based on the maximum difference value between the motor speed and a model speed and a reduction in the motor speed, may correct the anti-jerk torque based on a control model speed and an anti-jerk torque control factor upon determining that the motor speed is abnormal, and may control the motor speed using the corrected anti-jerk torque.

It is to be understood that both the foregoing general description and the following detailed description of the present disclosure are exemplary and explanatory and are intended to provide further explanation of the present disclosure as claimed.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
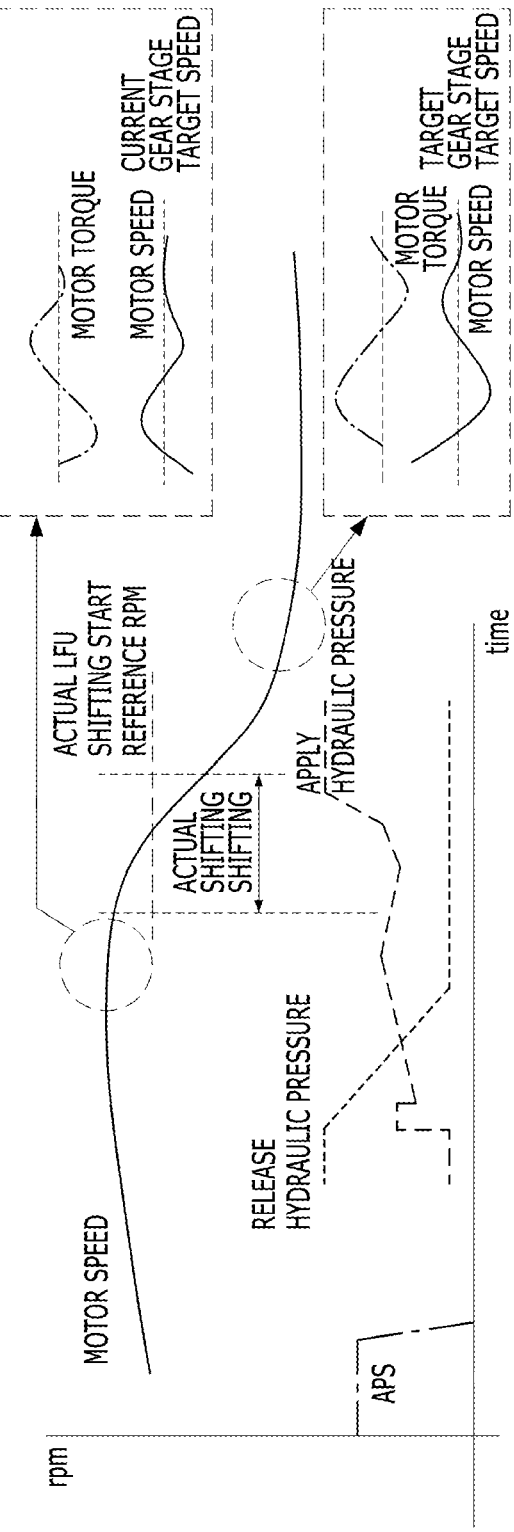
FIG. 1 is a graph showing changes in motor speed, release hydraulic pressure, and apply hydraulic pressure in accordance with lift-foot-up (LFU) shifting.
Figure 2:
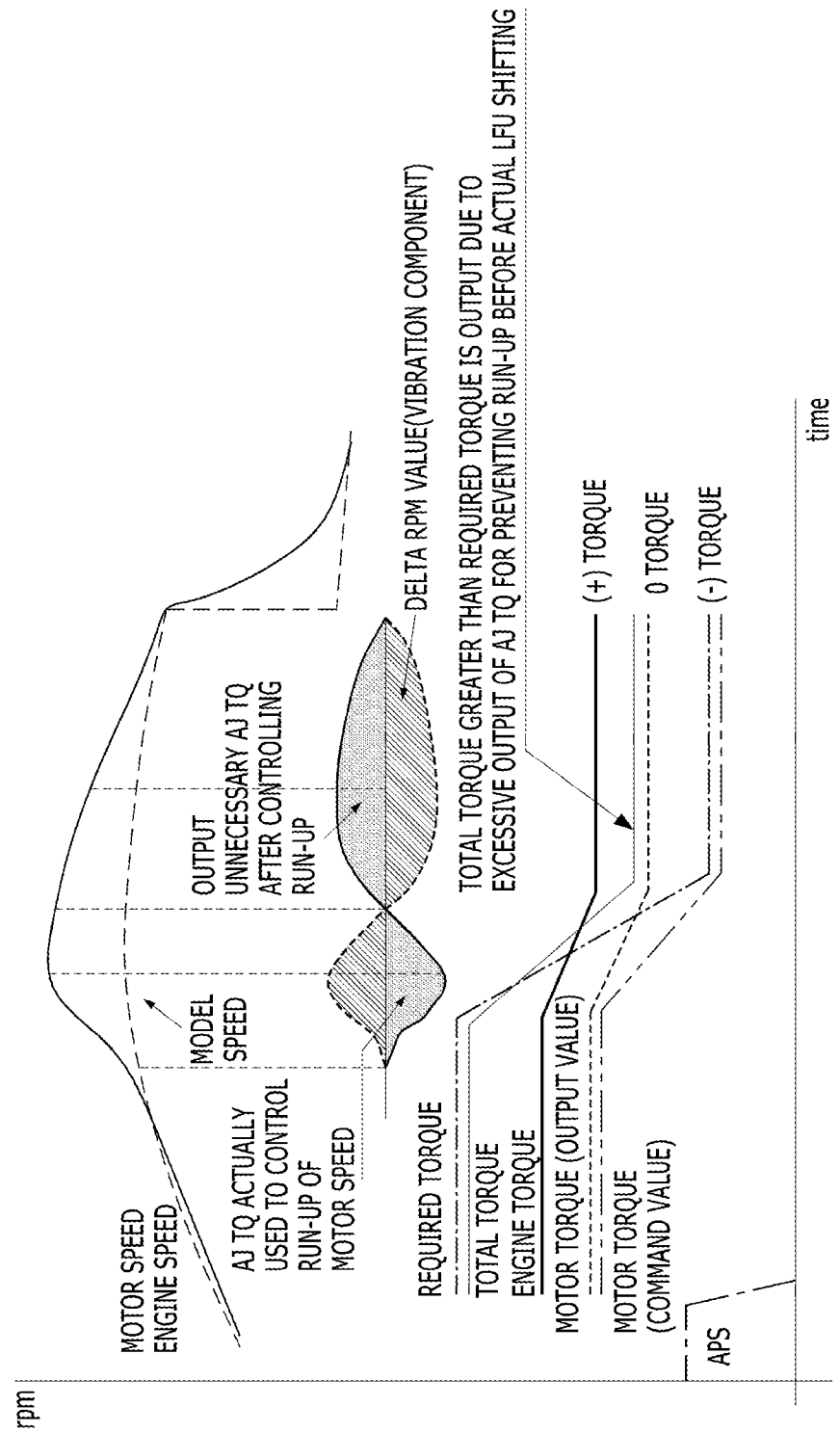
FIG. 2 is a graph showing the occurrence of engine flare in accordance with run-up prevention using anti-jerk torque.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the accompanying drawings so that those skilled in the art may easily carry out the forms. The present disclosure may, however, be embodied in many different forms, and should not be construed as being limited to the forms set forth herein. In the drawings, parts irrelevant to the description of the present disclosure will be omitted for clarity.

Throughout the specification, unless explicitly described to the contrary, the word "include" and variations such as "includes" or "including" will be understood to imply the inclusion of stated elements but not the exclusion of any other elements. In addition, the terms "-er", "-or" and "module" used in the specification mean units for processing at least one function or operation, and may be implemented using hardware components or software components and combinations thereof.

Throughout the specification, unless explicitly described to the contrary, the word "include" and variations such as "includes" or "including" will be understood to imply the inclusion of stated elements but not the exclusion of any other elements. In addition, the same reference numerals used throughout the specification refer to the same constituent elements.

Hereinafter, a motor torque control apparatus for a hybrid vehicle, a motor torque control method of the same, and a hybrid vehicle including the same, which may be applied to exemplary forms of the present disclosure, will be described in detail with reference to FIGS. 1 to 10.

Figure 3:
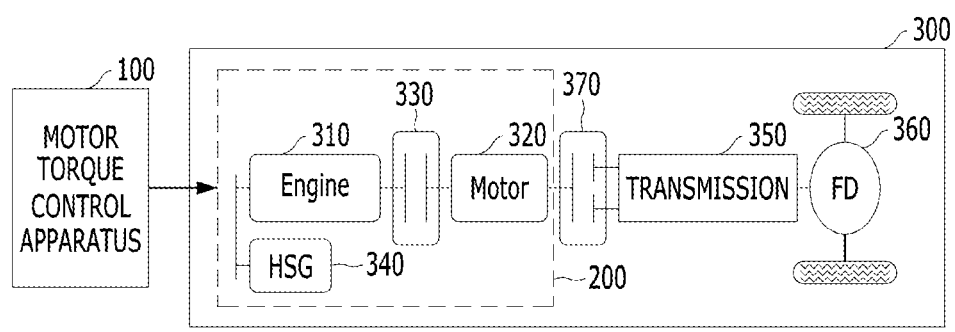
FIG. 3 is a schematic diagram for explaining a hybrid vehicle including a motor torque control apparatus according to one form of the present disclosure.

FIG. 3 is a schematic diagram for explaining a hybrid vehicle including a motor torque control apparatus according to one form of the present disclosure.

As shown in FIG. 3, a hybrid vehicle may include a hybrid power source 200, which includes a motor 320 and an engine 310, and a motor torque control apparatus 100 for controlling the motor torque of the hybrid power source 200.

In addition, the hybrid vehicle may include a powertrain 300 including the hybrid power source 200.

The powertrain 300 may employ a parallel-type hybrid system, in which a motor 320 and an engine clutch 330 are installed between an internal combustion engine 310 and a transmission 350.

In general, in such a hybrid vehicle, when a driver steps on an accelerator pedal after starting the vehicle, the motor 320 is first driven using the power from a battery in the state in which the engine clutch 330 is open, and then the power from the motor 320 is transmitted to wheels via the transmission 350 and a final drive (FD) 360 to drive the wheels (i.e. an EV mode).

When higher driving force is desired as the hybrid vehicle is gradually accelerated, a hybrid starter generator (HSG) 340 may be operated in order to drive the engine 310.

When the rotational speeds of the engine 310 and the motor 320 become equal, the engine clutch 330 is engaged, with the result that both the engine 310 and the motor 320 drive the vehicle (i.e. transition from the EV mode to an HEV mode).

When predetermined engine OFF conditions are satisfied, for example, when the hybrid vehicle is decelerated, the engine clutch 330 is opened, and the engine 310 is stopped (i.e. transition from the HEV mode to the EV mode).

At this time, in the hybrid vehicle, the battery is charged through the motor 320 using the driving force of the wheels, which is referred to as recovery of braking energy or regenerative braking.

The hybrid starter generator 340 may act as a starter motor when starting the engine 310 and may act as a generator when the rotation energy of the engine 310 is collected after starting the engine 310 or after starting off.

In the hybrid vehicle, the torque of the engine 310 may be controlled by an engine control unit, the torque of the motor 320 and the hybrid starter generator 340 may be controlled by a motor control unit of the motor torque control apparatus 100, and the engine clutch 330 may be controlled by a clutch control unit.

In addition, the transmission 350 may be controlled by a transmission control unit, and a dual clutch 370 may be installed to the transmission 350 and the motor 320.

The transmission 350 may be a general multi-stage automatic transmission (AT) or a dual-clutch transmission (DCT).

At the time of lift-foot-up (LFU) shifting, the motor torque control apparatus 100 may control run-up of the motor speed using anti-jerk torque, and may determine whether engine flare is occurring (whether the speed of the engine, the run-up of which is controlled, is abnormal) due to the anti-jerk torque based on the maximum difference value (a delta RPM value) between the motor speed and the model speed (the target speed) and a reduction in the motor speed. Upon determining that engine flare is occurring (i.e. that the speed of the engine, the run-up of which is controlled, is abnormal), the motor torque control apparatus 100 may calculate a flare control model speed (a control model speed) and an anti-jerk torque flare control factor (an anti-jerk torque control factor), may correct the anti-jerk torque based on the calculation results, and may control the motor speed using the corrected anti-jerk torque.

When controlling the run-up of the motor speed using the anti-jerk torque, if lift-foot-up (LFU) shifting occurs, the motor torque control apparatus 100 may determine the occurrence or non-occurrence of run-up of the motor speed, which is a phenomenon in which the motor speed is higher than the model speed (the target speed) during a shift preparation time period. Upon determining that the motor speed is higher than the model speed (i.e. that run-up of the motor speed is occurring), the motor torque control apparatus 100 may calculate the anti-jerk torque, and may control the run-up of the motor speed using the calculated anti-jerk torque.

In addition, when determining whether engine flare is occurring (whether the motor speed is abnormal), the motor torque control apparatus 100 may calculate the maximum difference value (a delta RPM value) between the model speed and the motor speed during the shift preparation time period, may calculate the reduction in the motor speed during the shift preparation time period, and may determine whether engine flare is occurring based on the calculated maximum difference value between the motor speed and the model speed and the calculated reduction in the motor speed.

Here, the maximum difference value between the model speed and the motor speed may be calculated at the time point at which variation in the motor speed changes from a positive (+) value to zero, and the reduction in the motor speed may be an average deceleration of the motor speed in a reference period of time after the time point at which variation in the motor speed changes from a positive (+) value to zero.

In addition, when determining whether engine flare is occurring (whether the motor speed is abnormal), the motor torque control apparatus 100 may determine whether a value obtained by dividing the maximum difference value between the model speed and the motor speed by the reduction in the motor speed is greater than or equal to a determination reference value. If the value obtained through the above division is greater than or equal to the determination reference value, the motor torque control apparatus 100 may determine that engine flare is occurring.

Subsequently, when correcting the anti-jerk torque, upon determining that engine flare is occurring (i.e. that the motor speed is abnormal), the motor torque control apparatus 100 may determine whether the difference value between the value obtained by dividing the maximum difference value between the model speed and the motor speed by the reduction in the motor speed and the determination reference value is greater than or equal to a control reference value. Upon determining that the difference value is greater than or equal to the control reference value, the motor torque control apparatus 100 may calculate a flare control model speed (a control model speed) and an anti-jerk torque flare control factor (an anti-jerk torque control factor), and may correct the anti-jerk torque based on the calculated flare control model speed and the calculated anti-jerk torque flare control factor.

Here, the flare control model speed may be a value obtained by adding the variation in the motor speed, which is decreased to a negative (−) value, to the model speed, and the anti-jerk torque flare control factor may be a factor value having the maximum difference value between the model speed and the motor speed and the reduction in the motor speed as input values.

In addition, when correcting the anti-jerk torque, the motor torque control apparatus 100 may correct the anti-jerk torque such that the anti-jerk torque is decreased by multiplying a gain value used to calculate the anti-jerk torque by the difference value between the model speed and the motor speed and the anti-jerk torque control factor, and may correct the anti-jerk torque such that the anti-jerk torque is decreased based on a vibration component value, which is calculated based on the difference value between the calculated control model speed and the motor speed.

In addition, upon determining that the difference value between the value obtained by dividing the maximum difference value between the model speed and the motor speed by the reduction in the motor speed and the determination reference value is less than the control reference value, the motor torque control apparatus 100 may calculate an anti-jerk torque flare control factor, and may correct the anti-jerk torque based on the calculated anti-jerk torque flare control factor.

Here, when correcting the anti-jerk torque, the motor torque control apparatus 100 may correct the anti-jerk torque such that the anti-jerk torque is decreased by multiplying a gain value used to calculate the anti-jerk torque by the difference value between the model speed and the motor speed and the anti-jerk torque flare control factor.

In addition, when correcting the anti-jerk torque, if the flare control model speed and the anti-jerk torque flare control factor are calculated, the motor torque control apparatus 100 may determine whether normal transition conditions are satisfied. Upon determining that normal transition conditions are satisfied, the motor torque control apparatus 100 may output the existing anti-jerk torque by setting the anti-jerk torque flare control factor to 1, and may transition from the flare control model speed to the existing model speed at a constant rate. If the variation in the motor speed is greater than a reference speed during the transition, the motor torque control apparatus 100 may calculate a vibration component in the state of maintaining the transitioned model speed at a constant value, and may output the anti-jerk torque based thereon.

Here, when determining whether normal transition conditions are satisfied, if none of a first condition pertaining to OFF of an accelerator pedal sensor (APS), a second condition pertaining to lock-up of the engine clutch, and a third condition pertaining to LFU shifting is satisfied, the motor torque control apparatus 100 may determine that the normal transition conditions are satisfied.

In addition, upon determining that the normal transition conditions are not satisfied, the motor torque control apparatus 100 may correct the anti-jerk torque based on the calculated flare control model speed and the calculated anti-jerk torque flare control factor.

As described above, according to the present disclosure, when run-up of the motor speed is controlled using the anti-jerk torque, if engine flare occurs, the anti-jerk torque is corrected based on the flare control model speed and the anti-jerk torque flare control factor, thereby robustly and actively controlling the motor torque in order to control run-up of the motor/engine speed during LFU shifting in a hybrid vehicle.

Figure 4:
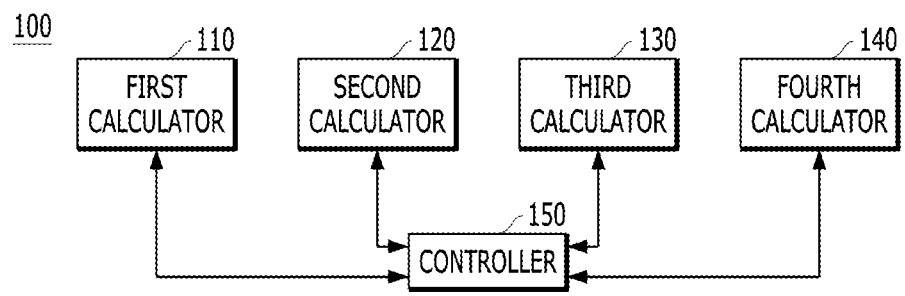
FIG. 4 is a block diagram for explaining the motor torque control apparatus for a hybrid vehicle according to one form of the present disclosure.

FIG. 4 is a block diagram for explaining the motor torque control apparatus for a hybrid vehicle according to one form of the present disclosure.

As shown in FIG. 4, the motor torque control apparatus 100 may include: a first calculator 110 for calculating a model speed of the motor and a flare control model speed (a control model speed), a second calculator 120 for calculating an anti-jerk torque (AJ TQ) of the motor and an anti-jerk torque flare control factor (an anti-jerk torque control factor), a third calculator 130 for calculating the maximum difference value between the model speed (the target speed) and the motor speed, a fourth calculator 140 for calculating a reduction in the motor speed including an average deceleration of the motor, and a controller 150 for controlling the first, second, third and fourth calculators 110, 120, 130 and 140.

The first calculator 110 may calculate the model speed (the target speed) by calculating the wheel speed as a transmission input reference speed in response to a first control signal from the controller 150, and may calculate the flare control model speed by adding the reduction in the motor speed to the model speed in response to a second control signal from the controller 150.

In this case, when the flare control model speed is calculated, the first calculator 110 may calculate a vibration component value based on the difference value (a delta RPM value) between the calculated flare control model speed and the motor speed.

In one example, the vibration component value may be a value output from a high-pass filter when the difference value between the flare control model speed and the motor speed is passed through the high-pass filter.

Subsequently, the second calculator 120 may calculate a vibration component value based on the maximum difference value (a delta RPM value) between the model speed and the motor speed in response to a third control signal from the controller 150, and may calculate anti-jerk torque based on the antiphase of the calculated vibration component value.

In one example, the vibration component value may be a value output from the high-pass filter when the maximum difference value between the model speed and the motor speed is passed through the high-pass filter.

In addition, the second calculator 120 may calculate an anti-jerk torque flare control factor based on an average deceleration of the motor in response to a fourth control signal from the controller 150.

The third calculator 130 may calculate the maximum difference value (a delta RPM value) between the model speed and the motor speed during a shift preparation time period in response to a fifth control signal from the controller 150.

The maximum difference value (the delta RPM value) between the model speed and the motor speed may be calculated at the time point at which the variation in the motor speed changes from a positive (+) value to zero.

The fourth calculator 140 may calculate an average deceleration of the motor in a reference period of time after the time point at which the variation in the motor speed changes from a positive (+) value to zero during the shift preparation time period in response to a sixth control signal from the controller 150.

In one example, the reference period of time may be about 10 ms to about 20 ms. However, the present disclosure is not limited thereto.

Meanwhile, at the time of lift-foot-up (LFU) shifting, the controller 150 may determine whether run-up of the motor speed is occurring during the shift preparation time period. Upon determining that run-up of the motor speed is occurring, the controller 150 may control the run-up of the motor speed using the anti-jerk torque, and may determine whether engine flare is occurring based on the calculated maximum difference value and the calculated average deceleration. Upon determining that engine flare is occurring, the controller 150 may correct the anti-jerk torque based on the calculated flare control model speed and the calculated anti-jerk torque flare control factor, and may control the motor torque using the corrected anti-jerk torque.

When determining whether run-up of the motor speed is occurring, if tip-out occurs after heavy tip-in (HTI) acceleration, the controller 150 may determine that LFU shifting is to be performed, and may determine whether run-up of the motor speed is occurring during the LFU shift preparation time period.

In addition, when determining whether run-up of the motor speed is occurring, if there is no occurrence of run-up of the motor speed, the controller 150 may control the motor to perform LFU shifting.

In addition, when controlling the run-up of the motor speed, if there is occurrence of run-up of the motor speed, the controller 150 may control the second calculator 120 to calculate an anti-jerk torque, and may control the run-up of the motor speed using the calculated anti-jerk torque.

Here, the anti-jerk torque may have an antiphase relationship with the vibration component value output from the high-pass filter when the maximum difference value (the delta RPM value) between the model speed and the motor speed is passed through the high-pass filter.

When determining whether engine flare is occurring, the controller 150 may control the third calculator 130 to calculate the maximum difference value between the model speed and the motor speed, may control the fourth calculator 140 to calculate an average deceleration of the motor, and may determine whether engine flare is occurring based on the calculated maximum difference value and the calculated average deceleration.

When determining whether engine flare is occurring, as is expressed using Equation 1 below, the controller 150 may determine whether a value obtained by dividing the maximum difference value (the delta RPM value) (a) by the average deceleration (b) is greater than or equal to the determination reference value (c), and if the value obtained through the above division is greater than or equal to the determination reference value (c), the controller 150 may determine that engine flare is occurring.

$$\text{Maximum Difference Value(Delta RPM Value)}(a)/\text{Average Deceleration}(b) \geq \text{Determination Reference Value}(c). \quad \text{(Equation 1)}:$$

Here, the maximum difference value (the delta RPM value) (a) may be the maximum difference value (the delta RPM value) between the model speed and the motor speed during the shift preparation time period, and may be calculated at the time point at which the variation in the motor speed changes from a positive (+) value to zero.

The average deceleration (b) may be the average deceleration of the motor in a reference period of time after the time point at which the variation in the motor speed changes from a positive (+) value to zero during the shift preparation time period.

In one example, the reference period of time may be about 10 ms to about 20 ms. However, the present disclosure is not limited thereto.

In addition, when determining whether engine flare is occurring, as is expressed using Equation 2 below, if the value obtained by dividing the maximum difference value (the delta RPM value) (a) by the average deceleration (b) is less than the determination reference value (c), the controller 150 may determine that engine flare is not occurring.

$$\text{Maximum Difference Value(Delta RPM Value)}(a)/\text{Average Deceleration}(b) < \text{Determination Reference Value}(c). \quad \text{(Equation 2)}:$$

When determining whether engine flare is occurring, if there is no occurrence of engine flare, the controller 150 may maintain control of run-up of the motor speed, and may control the motor to perform LFU shifting.

When correcting the anti-jerk torque, upon determining that engine flare is occurring, the controller 150 may determine whether the difference value between the value obtained by dividing the maximum difference value (the delta RPM value) by the average deceleration and the determination reference value is greater than or equal to a control reference value. Upon determining that the difference value is greater than or equal to the control reference value, the controller 150 may control the first calculator 110 to calculate a flare control model speed, may control the second calculator 120 to calculate an anti-jerk torque flare control factor, and may correct the anti-jerk torque based on the calculated flare control model speed and the calculated anti-jerk torque flare control factor.

Here, the flare control model speed may be a value obtained by adding the variation in the motor speed, which is decreased to a negative (−) value, to the model speed, and the anti-jerk torque flare control factor may be a factor value having the maximum difference value between the model speed and the motor speed and the average deceleration of the motor as input values.

That is, when the difference value is greater than or equal to the control reference value, the controller 150 may perform first flare control of correcting the anti-jerk torque such that the anti-jerk torque is decreased by multiplying a gain value used to calculate the anti-jerk torque by the maximum difference value and the anti-jerk torque flare control factor, and may perform second flare control of correcting the anti-jerk torque such that the anti-jerk torque is decreased based on a vibration component value, which is calculated based on the difference value between the calculated flare control model speed and the motor speed.

Here, the vibration component value may be a value output from the high-pass filter when the difference value between the flare control model speed and the motor speed is passed through the high-pass filter.

In addition, when the difference value is less than the control reference value, the controller 150 may control the second calculator 120 to calculate an anti-jerk torque flare control factor, and may correct the anti-jerk torque based on the calculated anti-jerk torque flare control factor.

That is, when the difference value is less than the control reference value, the controller 150 may perform only the first flare control of correcting the anti-jerk torque such that the anti-jerk torque is decreased by multiplying a gain value used to calculate the anti-jerk torque by the maximum difference value and the anti-jerk torque flare control factor.

When correcting the anti-jerk torque, if the flare control model speed and the anti-jerk torque flare control factor are calculated, the controller 150 may determine whether normal transition conditions are satisfied. Upon determining that normal transition conditions are satisfied, the controller 150 may output the existing anti-jerk torque by setting the anti-jerk torque flare control factor to 1, and may transition from the flare control model speed to the existing model speed at a constant rate. If the variation in the motor speed is greater than a reference speed during the transition, the controller 150 may calculate a vibration component in the state of maintaining the transitioned model speed at a constant value, and may output the anti-jerk torque based thereon.

Here, when determining whether normal transition conditions are satisfied, if none of a first condition pertaining to OFF of an accelerator pedal sensor (APS), a second condition pertaining to lock-up of the engine clutch, and a third condition pertaining to LFU shifting is satisfied, the controller 150 may determine that the normal transition conditions are satisfied.

In addition, upon determining that the normal transition conditions are not satisfied, the controller 150 may correct the anti-jerk torque based on the calculated flare control model speed and the calculated anti-jerk torque flare control factor.

Figure 6:
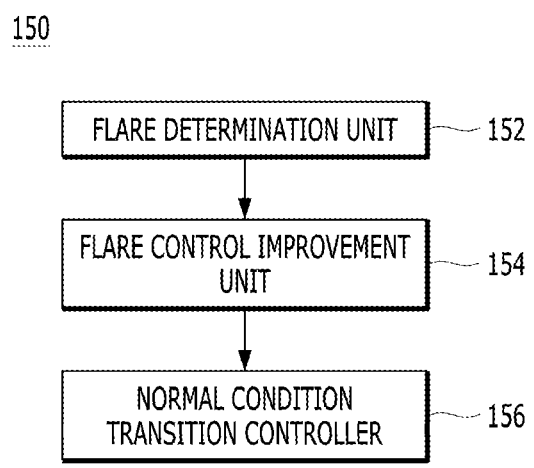
FIG. 6 is a block diagram for explaining a controller shown in FIG. 4.

FIG. 6 is a block diagram for explaining the controller shown in FIG. 4.

As shown in FIG. 6, the controller 150 may include a flare determination unit 152, which determines whether engine flare is occurring based on the calculated maximum difference value (the delta RPM value) and the calculated average deceleration, a flare control improvement unit 154, which corrects the anti-jerk torque based on the calculated flare control model speed and the calculated anti-jerk torque flare control factor upon determining that engine flare is occurring, and a normal condition transition controller 156, which transitions the model speed at a constant rate and maintains the transitioned model speed at a constant value when the calculated flare control model speed and the calculated anti-jerk torque flare control factor satisfy the normal transition conditions.

The flare determination unit 152 may compare the value obtained by dividing the maximum difference value by the average deceleration with the determination reference value to determine whether engine flare is occurring. Upon determining that engine flare is occurring, the flare determination unit 152 may calculate a flare control model speed and an anti-jerk torque flare control factor by comparing the difference value between the value obtained by dividing the maximum difference value by the average deceleration and the determination reference value with the control reference value, or may transmit a determination signal to the flare control improvement unit 154 to calculate only an anti-jerk torque flare control factor.

Subsequently, in response to the determination signal from the flare determination unit 152, the flare control improvement unit 154 may perform both the first flare control of correcting the anti-jerk torque such that the anti-jerk torque is decreased by multiplying a gain value used to calculate the anti-jerk torque by the maximum difference value and the anti-jerk torque flare control factor and the second flare control of correcting the anti-jerk torque such that the anti-jerk torque is decreased based on a vibration component value, which is calculated based on the difference value between the calculated flare control model speed and the motor speed, or may perform only the first flare control.

Subsequently, when the normal transition conditions are satisfied, the normal condition transition controller 156 may output the existing anti-jerk torque by setting the anti-jerk torque flare control factor to 1, and may transition from the flare control model speed to the existing model speed at a constant rate. If the variation in the motor speed is greater than a reference speed during the transition, the normal condition transition controller 156 may calculate a vibration component in the state of maintaining the transitioned model speed at a constant value, and may output the anti-jerk torque based thereon.

Figure 5:
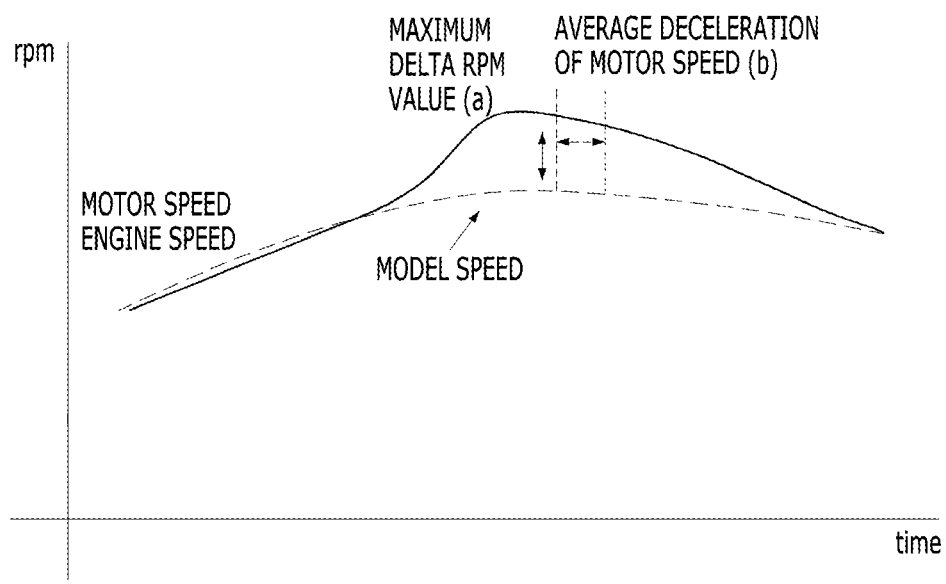
FIG. 5 is a graph for explaining a flare determination process.

FIG. 5 is a graph for explaining a flare determination process.

As shown in FIG. 5, according to the present disclosure, when controlling run-up of the motor speed, the occurrence or non-occurrence of engine flare may be determined based on the maximum difference value (the delta RPM value) (a) between the model speed and the motor speed and the average deceleration (b) of the motor.

The maximum difference value (the delta RPM value) (a) between the model speed and the motor speed and the average deceleration (b) of the motor may be calculated during the shift preparation time period.

Here, the maximum difference value (the delta RPM value) (a) between the model speed and the motor speed may be calculated at the time point at which the variation in the motor speed changes from a positive (+) value to zero.

The average deceleration (b) may be the average deceleration of the motor in a reference period of time after the time point at which the variation in the motor speed changes from a positive (+) value to zero during the shift preparation time period.

In one example, the reference period of time may be about 10 ms to about 20 ms. However, the present disclosure is not limited thereto.

Subsequently, according to one form of the present disclosure, as is expressed using Equation 1 below, it may be determined whether a value obtained by dividing the maximum difference value (the delta RPM value) (a) by the average deceleration (b) is greater than or equal to the determination reference value (c). If the value obtained through the above division is greater than or equal to the determination reference value (c), it may be determined that engine flare is occurring, and a flare control logic may be executed.

Maximum Difference Value(Delta RPM Value)(a)/ Average Deceleration(b)≥Determination Reference Value(c). (Equation 1):

Here, the maximum difference value (the delta RPM value) (a) may be the maximum difference value (the delta RPM value) between the model speed and the motor speed during the shift preparation time period, and may be calculated at the time point at which the variation in the motor speed changes from a positive (+) value to zero.

In addition, according to the present disclosure, as is expressed using Equation 2 below, if the value obtained by dividing the maximum difference value (the delta RPM value) (a) by the average deceleration (b) is less than the determination reference value (c), it may be determined that engine flare is not occurring, and the existing run-up control may be maintained.

Maximum Difference Value(Delta RPM Value)(a)/ Average Deceleration(b)<Determination Reference Value(c). (Equation 2):

When determining whether engine flare is occurring, if there is no occurrence of engine flare, the controller 150 may maintain control of run-up of the motor speed, and may control the motor to perform LFU shifting.

The flare determination process according to one form of the present disclosure is as follows.

When the accelerator pedal sensor (APS) is in an OFF state, when the engine clutch is in a lock-up state, and when the transmission control unit (TCU) performs LFU shifting, the variation in the motor speed is calculated, and the maximum delta RPM value (a) at the time point at which the variation in the motor speed changes from a positive (+) value to zero is calculated.

Subsequently, the average reduction in the motor speed (b) in a reference period of time (about 10 ms to about 20 ms) after the time point at which the variation in the motor speed changes from a positive (+) value to zero is calculated, thereby predicting the time period within which the motor speed will reach the model speed.

If each of the calculated delta RPM value and the time period within which the motor speed will reach the model speed is greater than or equal to the flare determination reference value (c), it is determined that engine flare is occurring, and the flare control logic is executed.

Figure 7:
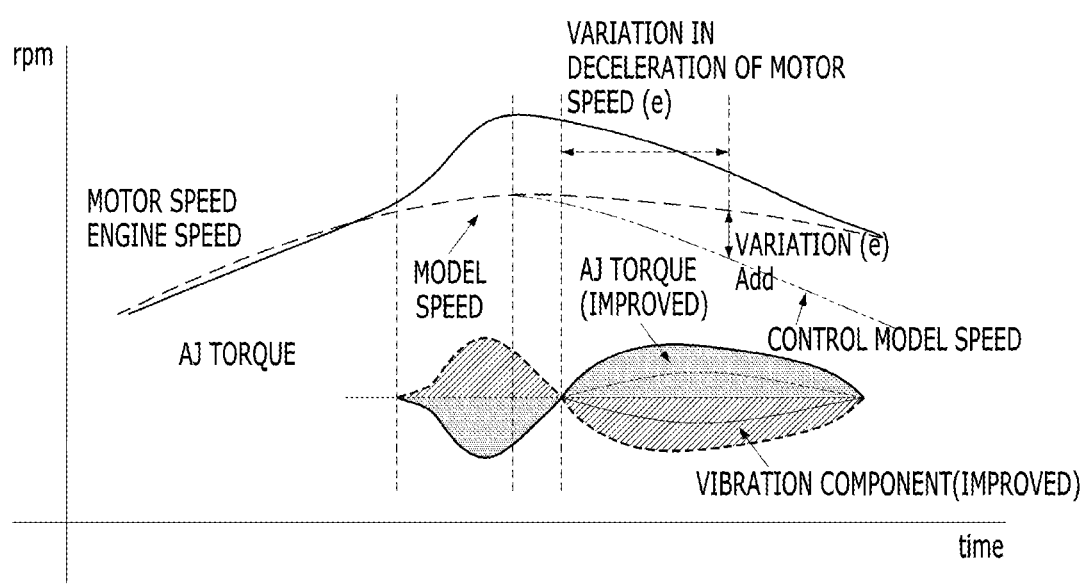
FIG. 7 is a graph for explaining a flare control improvement process.

FIG. 7 is a graph for explaining a flare control improvement process.

As shown in FIG. 7, according to another form of the present disclosure, when the flare control logic is executed, as is expressed using Equation 3 below, it may be determined whether the difference value between the value obtained by dividing the maximum difference value (the delta RPM value) by the average deceleration and the determination reference value is greater than or equal to a control reference value. If the difference value is greater than or equal to the control reference value, the first flare control and the second flare control may be performed.

Maximum Difference Value(Delta RPM Value)(a)/ Average Deceleration(b)−Determination Reference Value(c)≥Control Reference Value(d). (Equation 3):

In addition, according to another form of the present disclosure, as is expressed using Equation 4 below, if the difference value is less than the control reference value, only the first flare control may be performed.

Maximum Difference Value(Delta RPM Value)(a)/ Average Deceleration(b)−Determination Reference Value(c)<Control Reference Value(d). (Equation 4):

As is expressed using Equation 5 below, the first flare control is flare control of correcting the anti-jerk torque such that the anti-jerk torque is decreased by multiplying a gain value used to calculate the anti-jerk torque by the maximum difference value and the anti-jerk torque flare control factor.

$$\text{Anti-Jerk Torque} = \text{Maximum Difference Value(Delta RPM Value)} \times \text{Gain Value} \times \text{Anti-Jerk Torque Flare Control Factor.} \quad \text{(Equation 5):}$$

Here, the anti-jerk torque flare control factor may be a factor value having the maximum difference value between the model speed and the motor speed and the average deceleration of the motor as input values.

The second flare control is flare control of correcting the anti-jerk torque such that the anti-jerk torque is decreased based on a vibration component value, which is calculated based on the difference value between the flare control model speed and the motor speed.

Here, the flare control model speed may be a value obtained by adding the variation (e) in the motor speed, which is decreased to a negative (−) value, to the model speed.

The vibration component value may be a value output from the high-pass filter when the difference value between the flare control model speed and the motor speed is passed through the high-pass filter.

The flare control improvement process in one form of the present disclosure is as follows.

According to the form, when the flare control logic is executed, a two-stage flare control scheme may be used.

When the difference between the value (a)/(b) calculated as described above and the flare determination reference value (c) is greater than or equal to the control reference value (d), both a first-stage flare control scheme and a second-stage flare control scheme are used. When the difference is less than (d), only the first-stage flare control scheme is used.

The first-stage flare control scheme is a scheme of decreasing excessive anti-jerk torque (AJ TQ) by multiplying a gain value used to calculate the anti-jerk torque (AJ TQ) by a factor value having the maximum delta RPM value and the average deceleration of the motor as input values.

$$\text{AJ TQ} = \text{Delta RPM Value(motor speed−model speed)} \times \text{Gain} \times \text{Flare Control Factor}$$

The second-stage flare control scheme is a scheme of calculating a flare control model speed by adding the variation (e) in the motor speed, which is decreased to a negative (−) value, to the model speed and of calculating a vibration component based on the delta RPM, which is the difference between the flare control model speed and the motor speed.

The anti-jerk torque (AJ TQ) is decreased by this vibration component.

Figure 8:
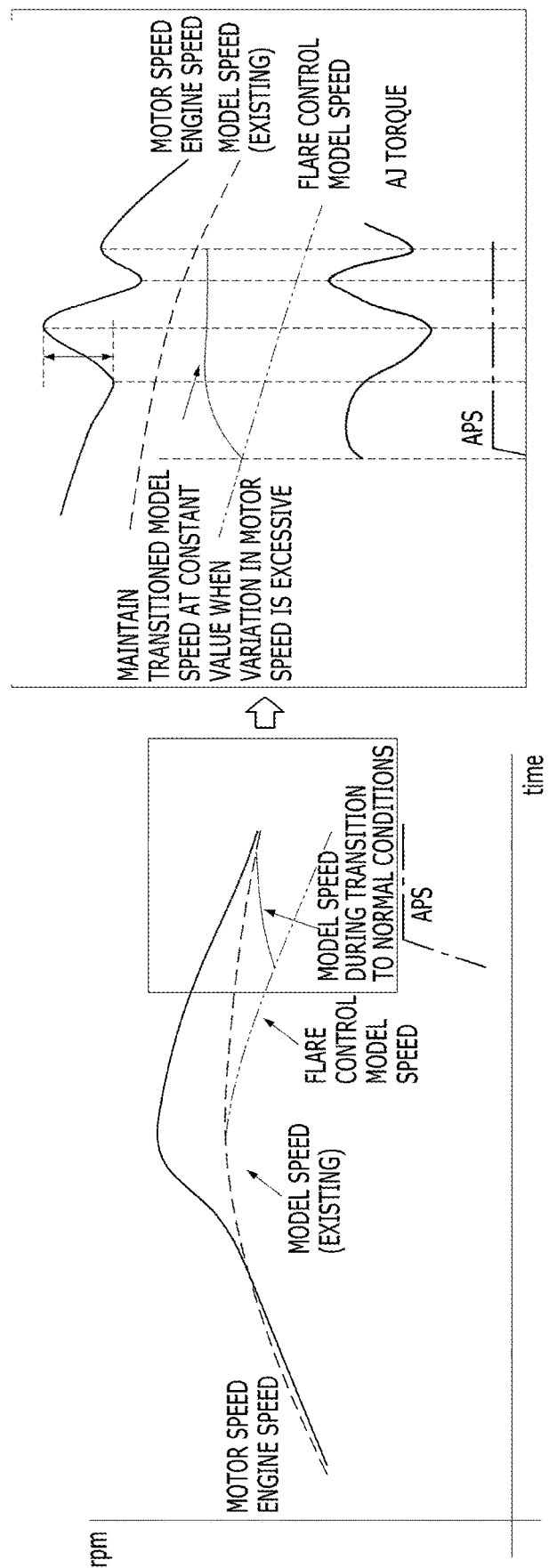
FIG. 8 is a graph for explaining a normal condition transition control process.

FIG. 8 is a graph for explaining a normal condition transition control process.

As shown in FIG. 8, according to one form of the present disclosure, if the flare control model speed and the anti-jerk torque flare control factor are calculated, it may be determined whether normal transition conditions are satisfied. If normal transition conditions are satisfied, the existing anti-jerk torque may be output by setting the anti-jerk torque flare control factor to 1, and the flare control model speed may be transitioned to the existing model speed at a constant rate. If the variation in the motor speed is greater than a reference speed during the transition, a vibration component may be calculated in the state of maintaining the transitioned model speed at a constant value, and the anti-jerk torque may be output based thereon.

Here, according to another form of the present disclosure, when it is determined whether normal transition conditions are satisfied, if none of a first condition pertaining to OFF of an accelerator pedal sensor (APS), a second condition pertaining to lock-up of the engine clutch, and a third condition pertaining to LFU shifting is satisfied, it may be determined that the normal transition conditions are satisfied.

In addition, according to other aspect of the present disclosure, if normal transition conditions are not satisfied, the anti-jerk torque may be corrected based on the calculated flare control model speed and the calculated anti-jerk torque flare control factor.

The normal condition transition control process as one form of the present disclosure is as follows.

According to one form of the present disclosure, when the flare entry control conditions (APS OFF, Engine Clutch Lock-Up, and LFU Shifting) are not satisfied, it is determined that the normal conditions are satisfied, and control of transition to the normal conditions is performed.

In the first-stage control, during the transition to the normal conditions, the existing anti-jerk torque (AJ TQ) calculation value is output by setting the flare factor to 1.

In the second-stage control, the flare control model speed is transitioned to the existing model speed at a constant rate. If the variation in the speed exceeds a predetermined value during the transition, a vibration component is calculated in the state of maintaining the model speed at a constant value, and the anti-jerk torque is output.

Figure 9:
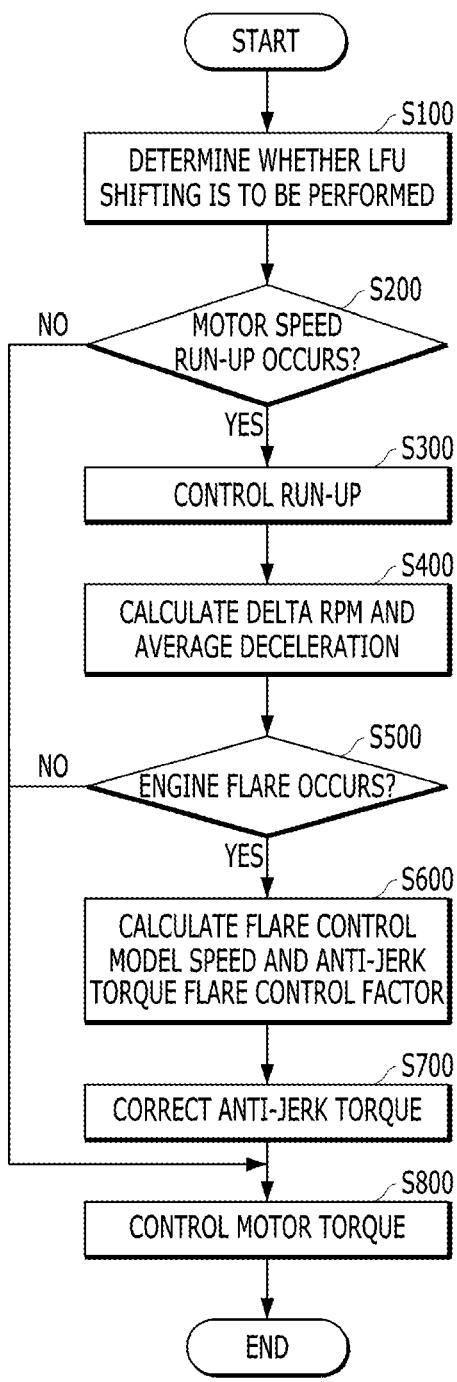
FIG. 9 is a flowchart for explaining a motor torque control method of the motor torque control apparatus for a hybrid vehicle according to one form of the present disclosure.

FIG. 9 is a flowchart for explaining a motor torque control method of the motor torque control apparatus for a hybrid vehicle according to another form of the present disclosure.

As shown in FIG. 9, it is determined whether lift-foot-up (LFU) shifting is to be performed (S100).

Subsequently, when it is determined that lift-foot-up (LFU) shifting is to be performed, it is determined whether run-up of the motor speed is occurring during the shift preparation time period (S200).

Here, if tip-out occurs after heavy tip-in (HTI) acceleration, it may be determined that LFU shifting is to be performed.

If there is no occurrence of run-up of the motor speed, the motor may be controlled to perform LFU shifting.

If there is occurrence of run-up of the motor speed, the run-up of the motor speed is controlled using anti-jerk torque (S300).

If there is occurrence of run-up of the motor speed, anti-jerk torque may be calculated, and the run-up of the motor speed may be controlled using the calculated anti-jerk torque.

Subsequently, the maximum difference value between the model speed and the motor speed and the average deceleration of the motor are calculated (S400).

It is determined whether engine flare is occurring based on the calculated maximum difference value and the calculated average deceleration (S500).

It is determined whether a value obtained by dividing the maximum difference value by the average deceleration is greater than or equal to a determination reference value. If the value obtained through the above division is greater than or equal to the determination reference value, it may be determined that engine flare is occurring.

If there is no occurrence of engine flare, control of the run-up of the motor speed may be maintained, and the motor may be controlled to perform LFU shifting.

Subsequently, when it is determined that engine flare is occurring, a flare control model speed and an anti-jerk torque flare control factor are calculated (S600).

Subsequently, the anti-jerk torque is corrected based on the calculated flare control model speed and the calculated anti-jerk torque flare control factor (S700).

When it is determined that engine flare is occurring, it is determined whether the difference value between the value obtained by dividing the maximum difference value by the average deceleration and the determination reference value is greater than or equal to a control reference value. If the difference value is greater than or equal to the control reference value, a flare control model speed and an anti-jerk torque flare control factor may be calculated, and the anti-jerk torque may be corrected based on the calculated flare control model speed and the calculated anti-jerk torque flare control factor.

Here, the flare control model speed may be a value obtained by adding the variation in the motor speed, which is decreased to a negative (−) value, to the model speed, and the anti-jerk torque flare control factor may be a factor value having the average deceleration of the motor as an input value.

That is, a first flare control scheme may be performed so as to correct the anti-jerk torque such that the anti-jerk torque is decreased by multiplying a gain value used to calculate the anti-jerk torque by the maximum difference value and the anti-jerk torque flare control factor, and a second flare control scheme may be performed so as to correct the anti-jerk torque such that the anti-jerk torque is decreased based on a vibration component value, which is calculated based on the difference value between the calculated flare control model speed and the motor speed.

Here, the vibration component value may be a value output from the high-pass filter when the difference value between the flare control model speed and the motor speed is passed through the high-pass filter.

In addition, when the difference value is less than the control reference value, an anti-jerk torque flare control factor may be calculated, and the anti-jerk torque may be corrected based on the calculated anti-jerk torque flare control factor.

That is, the first flare control scheme may be performed so as to correct the anti-jerk torque such that the anti-jerk torque is decreased by multiplying a gain value used to calculate the anti-jerk torque by the maximum difference value and the anti-jerk torque flare control factor.

In some cases, the control method as another form of present disclosure may further include: a step of determining whether normal transition conditions are satisfied if the flare control model speed and the anti-jerk torque flare control factor are calculated when correcting the anti-jerk torque; a step of outputting the existing anti-jerk torque by setting the anti-jerk torque flare control factor to 1 if normal transition conditions are satisfied; and a step of transitioning from the flare control model speed to the existing model speed at a constant rate, calculating a vibration component in the state of maintaining the transitioned model speed at a constant value if the variation in the motor speed is greater than a reference speed during the transition, and outputting the anti-jerk torque based thereon.

Here, if none of a first condition pertaining to OFF of an accelerator pedal sensor (APS), a second condition pertaining to lock-up of the engine clutch, and a third condition pertaining to LFU shifting is satisfied, it may be determined that the normal transition conditions are satisfied.

In addition, if the normal transition conditions are not satisfied, the anti-jerk torque may be corrected based on the calculated flare control model speed and the calculated anti-jerk torque flare control factor.

Subsequently, the motor torque is controlled using the corrected anti-jerk torque (S800).

Figure 10:
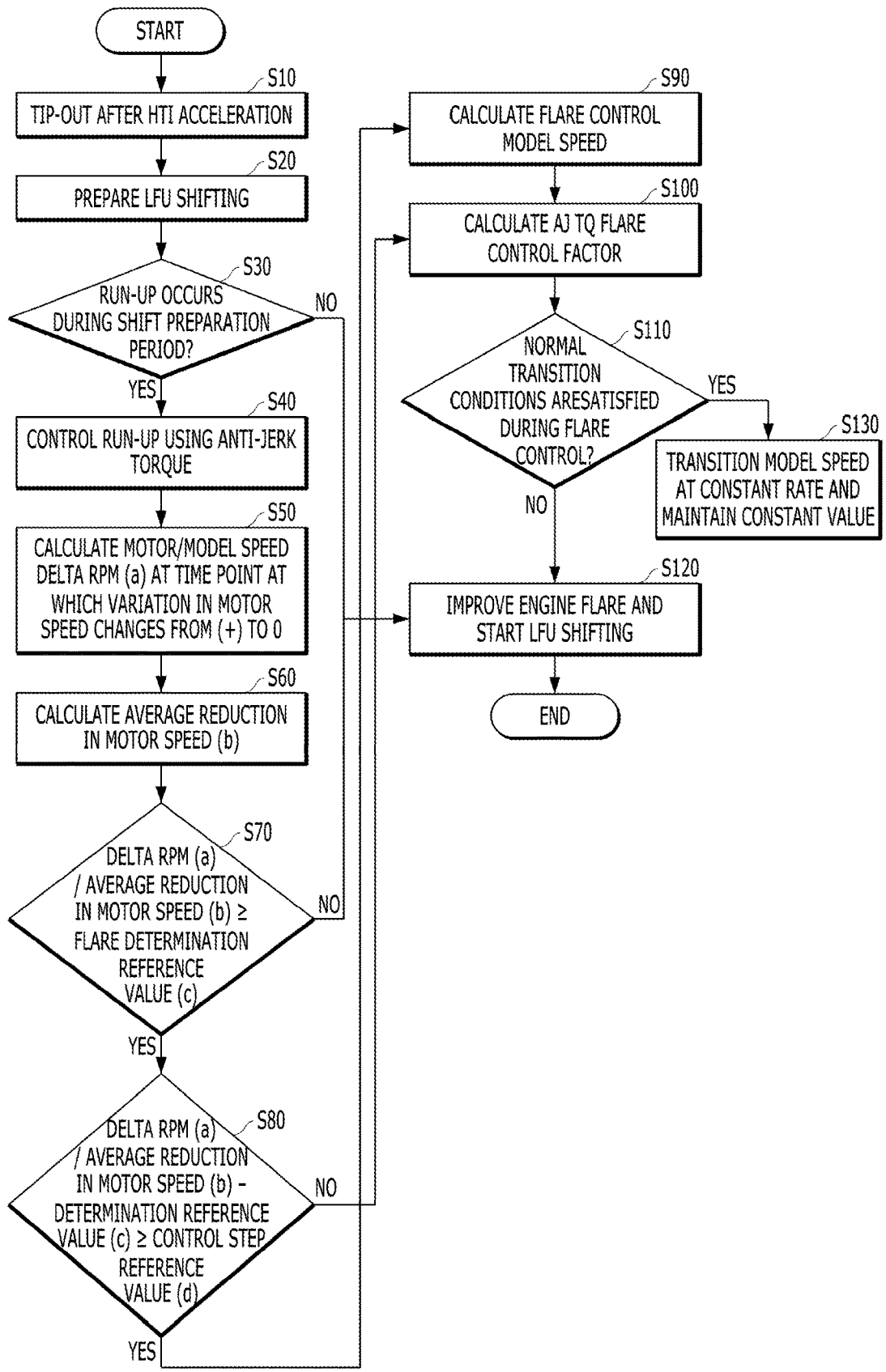
FIG. 10 is a flowchart for explaining a motor torque control method of the motor torque control apparatus for a hybrid vehicle according to another form of the present disclosure.

FIG. 10 is a flowchart for explaining a motor torque control method of the motor torque control apparatus for a hybrid vehicle according to another form of the present disclosure.

As shown in FIG. 10, it is determined whether lift-foot-up (LFU) shifting is to be performed (S10).

Subsequently, when it is determined that lift-foot-up (LFU) shifting is to be performed, it is determined whether run-up of the motor speed is occurring during the shift preparation time period (S20).

Here, if tip-out occurs after heavy tip-in (HTI) acceleration, it may be determined that LFU shifting is to be performed.

If there is no occurrence of run-up of the motor speed, the motor may be controlled to perform LFU shifting.

If there is occurrence of run-up of the motor speed, the run-up of the motor speed is controlled using anti-jerk torque (S30).

If there is occurrence of run-up of the motor speed, anti-jerk torque may be calculated, and the run-up of the motor speed may be controlled using the calculated anti-jerk torque (S40).

Subsequently, the maximum difference value between the model speed and the motor speed is calculated (S50), and the average deceleration of the motor is calculated (S60).

The maximum difference value (the delta RPM value) (a) between the model speed and the motor speed and the average deceleration (b) of the motor may be calculated during the shift preparation time period.

Here, the maximum difference value (the delta RPM value) (a) between the model speed and the motor speed may be calculated at the time point at which the variation in the motor speed changes from a positive (+) value to zero.

The average deceleration (b) may be the average deceleration of the motor in a reference period of time after the time point at which the variation in the motor speed changes from a positive (+) value to zero during the shift preparation time period.

In one example, the reference period of time may be about 10 ms to about 20 ms. However, the present disclosure is not limited thereto.

It may be determined whether a value obtained by dividing the maximum difference value by the average deceleration is greater than or equal to a determination reference value (S70).

As is expressed using Equation 1 below, it may be determined whether the value obtained by dividing the maximum difference value (the delta RPM value) (a) by the average deceleration (b) is greater than or equal to the determination reference value (c). If the value obtained through the above division is greater than or equal to the determination reference value, it may be determined that engine flare is occurring, and a flare control logic may be executed.

$$\text{Maximum Difference Value(Delta RPM Value)}(a)/\text{Average Deceleration}(b) \geq \text{Determination Reference Value}(c). \quad \text{(Equation 1)}:$$

Here, the maximum difference value (the delta RPM value) (a) may be the maximum difference value (the delta RPM value) between the model speed and the motor speed during the shift preparation time period, and may be calculated at the time point at which the variation in the motor speed changes from a positive (+) value to zero.

In addition, as is expressed using Equation 2 below, if the value obtained by dividing the maximum difference value (the delta RPM value) (a) by the average deceleration (b) is less than the determination reference value (c), it may be determined that engine flare is not occurring, and the existing run-up control may be maintained.

Maximum Difference Value(Delta RPM Value)($a$)/
Average Deceleration($b$)<Determination Reference Value($c$). (Equation 2):

If there is no occurrence of engine flare, control of the run-up of the motor speed may be maintained, and the motor may be controlled to perform LFU shifting.

Subsequently, if the value obtained by dividing the maximum difference value by the average deceleration is greater than or equal to the determination reference value, it may be determined whether the difference value between the value obtained by dividing the maximum difference value by the average deceleration and the determination reference value is greater than or equal to a control reference value (S80).

That is, when the flare control logic is executed, as is expressed using Equation 3 below, it may be determined whether the difference value between the value obtained by dividing the maximum difference value (the delta RPM value) by the average deceleration and the determination reference value is greater than or equal to the control reference value. If the difference value is greater than or equal to the control reference value, flare control may be performed by calculating a flare control model speed and an anti-jerk torque flare control factor.

Maximum Difference Value(Delta RPM Value)($a$)/
Average Deceleration($b$)−Determination Reference Value($c$)≥Control Reference Value($d$). (Equation 3):

In addition, as is expressed using Equation 4 below, if the difference value is less than the control reference value, flare control may be performed by calculating only an anti-jerk torque flare control factor.

Maximum Difference Value(Delta RPM Value)($a$)/
Average Deceleration($b$)−Determination Reference Value($c$)<Control Reference Value($d$). (Equation 4):

If the difference value is greater than or equal to the control reference value, a flare control model speed and an anti-jerk torque flare control factor are calculated (S90 and S100).

If the difference value is less than the control reference value, an anti-jerk torque flare control factor is calculated (S100).

Here, the flare control model speed may be a value obtained by adding the variation in the motor speed, which is decreased to a negative (−) value, to the model speed, and the anti-jerk torque flare control factor may be a factor value having the maximum difference value between the model speed and the motor speed and the average deceleration of the motor as input values.

If the flare control model speed and the anti-jerk torque flare control factor are calculated, it is determined whether normal transition conditions are satisfied (S110).

If the normal transition conditions are satisfied, the existing anti-jerk torque may be output by setting the anti-jerk torque flare control factor to 1.

The flare control model speed may be transitioned to the existing model speed at a constant rate. If the variation in the motor speed is greater than a reference speed during the transition, a vibration component may be calculated in the state of maintaining the transitioned model speed at a constant value, and the anti-jerk torque may be output based thereon (S130).

If the normal transition conditions are not satisfied, the anti-jerk torque is corrected based on the calculated flare control model speed and the calculated anti-jerk torque flare control factor, and the motor torque is controlled using the corrected anti-jerk torque (S120).

In step S80, if the difference value is greater than or equal to the control reference value, both the first flare control and the second flare control may be performed, and if the difference value is less than the control reference value, only the first flare control may be performed.

As is expressed using Equation 5 below, the first flare control is flare control of correcting the anti-jerk torque such that the anti-jerk torque is decreased by multiplying a gain value used to calculate the anti-jerk torque by the maximum difference value and the anti-jerk torque flare control factor.

Anti-Jerk Torque=Maximum Difference Value(Delta RPM Value)×Gain Value×Anti-Jerk Torque Flare Control Factor. (Equation 5):

Here, the anti-jerk torque flare control factor may be a factor value having the maximum difference value between the model speed and the motor speed and the average deceleration of the motor as input values.

The second flare control is flare control of correcting the anti-jerk torque such that the anti-jerk torque is decreased based on a vibration component value, which is calculated based on the difference value between the flare control model speed and the motor speed.

Here, the flare control model speed may be a value obtained by adding the variation (e) in the motor speed, which is decreased to a negative (−) value, to the model speed.

The vibration component value may be a value output from the high-pass filter when the difference value between the flare control model speed and the motor speed is passed through the high-pass filter.

As is apparent from the above description, the present disclosure provides a motor torque control apparatus for a hybrid vehicle, a motor torque control method of the same, and a hybrid vehicle including the same, in which, when run-up of a motor speed is controlled using anti-jerk torque, if engine flare occurs, the anti-jerk torque is corrected based on a flare control model speed and an anti-jerk torque flare control factor, thereby robustly and actively controlling motor torque in order to control run-up of a motor/engine speed during LFU shifting in a hybrid vehicle.

In addition, LFU shifting performance and drivability may be improved.

That is, when LFU shifting is performed after heavy tip-in (HTI) and tip-out, a shift preparation time period may be shortened, thereby securing fast responsiveness to LFU shifting.

If LFU shifting is implemented rapidly, when power-on shifting occurs due to tip-in during the LFU shifting, a shock/jerk phenomenon may occur. However, according to the present disclosure, the frequency and probability of occurrence of the shock/jerk phenomenon may be reduced, thereby improving drivability.

In addition, fuel efficiency may be improved.

That is, according to the present disclosure, a hydraulic pressure standby time period for engagement of a transmission may be shortened due to reduction in an LFU shift preparation time period, and thus the power consumption of an electronic oil pump (EOP) may be reduced, thereby improving fuel efficiency.

For example, fuel efficiency may be improved by about 1.5% due to reduction in the amount of power consumed by the EOP every time LFU shifting is performed.

In addition, the present disclosure may increase the marketability of a vehicle.

At the time of HTI and tip-out at a high speed on an uphill road in a lock-up state of an engine clutch, if flare occurs due to delay of LFU shifting, an occupant in a vehicle may hear a booming sound due to a high engine RPM, and may thus determine that the corresponding vehicle has serious noise, vibration and harshness (NVH) problems.

The present disclosure may solve NVH problems and may increase the marketability of a vehicle by securing a flare improvement effect due to a reduction in the LFU shift preparation time period.

In addition, a program recorded on a recording medium on which a program for executing the motor torque control method of the motor torque control apparatus for a hybrid vehicle is recorded may further realize the processes provided in the motor torque control method of the motor torque control apparatus for a hybrid vehicle according to the form of the present disclosure.

The present disclosure described above may be implemented as a computer-readable code of a computer-readable medium in which programs are recorded. The computer-readable medium includes all kinds of recording devices in which data that may be read by a computer system is stored. Examples of the computer-readable medium may include a hard disk drive (HDD), a solid-state disk (SSD), a silicon disk drive (SDD), ROM, RAM, a CD-ROM, a magnetic tape, a floppy disk, and an optical data storage device.

The detailed description above is not intended to be construed to limit the present disclosure in all aspects, but is to be considered by way of example. The scope of the present disclosure should be determined by reasonable interpretation of the accompanying claims, and all equivalent modifications made without departing from the scope of the present disclosure should be included in the following claims.

What is claimed is:

1. A motor torque control apparatus for a hybrid vehicle, the motor torque control apparatus comprising:
    a first calculator configured to calculate a model speed of a motor and a control model speed;
    a second calculator configured to calculate an anti-jerk torque of the motor and an anti-jerk torque control factor;
    a third calculator configured to calculate a maximum difference value between the model speed and a motor speed;
    a fourth calculator configured to calculate a reduction in the motor speed; and
    a controller configured to control the first calculator, the second calculator, the third calculator, and the fourth calculator,
    wherein, at a time of lift-foot-up (LFU) shifting, the controller is configured to:
        control the motor speed using the anti-jerk torque,
        determine whether the motor speed controlled using the anti-jerk torque is abnormal based on the maximum difference value between the motor speed and the model speed and the reduction in the motor speed,
        correct the anti-jerk torque based on the control model speed and the anti-jerk torque control factor upon determining that the motor speed is abnormal, and
        control the motor speed using the corrected anti-jerk torque.

2. The motor torque control apparatus according to claim 1, wherein, when controlling the motor speed using the anti-jerk torque, and when the LFU shifting occurs, the controller is configured to determine whether the motor speed is higher than the model speed during a shift preparation time period, and
    wherein, upon determining that the motor speed is higher than the model speed, the controller is configured to control the second calculator to calculate the anti-jerk torque and control the motor speed using the calculated anti-jerk torque.

3. The motor torque control apparatus according to claim 1, wherein, when determining whether the motor speed is abnormal, the controller is configured to:
    control the third calculator to calculate the maximum difference value between the model speed and the motor speed during a shift preparation time period,
    control the fourth calculator to calculate the reduction in the motor speed during the shift preparation time period, and
    determine whether the motor speed is abnormal based on the calculated maximum difference value between the motor speed and the model speed and the calculated reduction in the motor speed.

4. The motor torque control apparatus according to claim 3, wherein the maximum difference value between the model speed and the motor speed is calculated at a time point at which variation in motor speed changes from a positive (+) value to zero, and
    wherein the reduction in the motor speed is an average deceleration of the motor in a reference period of time after the time point at which variation in the motor speed changes from a positive (+) value to zero.

5. The motor torque control apparatus according to claim 1, wherein, when determining whether the motor speed is abnormal, the controller is configured to determine whether a value obtained by dividing the maximum difference value between the model speed and the motor speed by the reduction in the motor speed is greater than or equal to a determination reference value, and
    wherein, upon determining that the value obtained by dividing the maximum difference value by the reduction in the motor speed is greater than or equal to the determination reference value, the controller is configured to determine that the motor speed is abnormal.

6. The motor torque control apparatus according to claim 1, wherein, when correcting the anti-jerk torque, upon determining that the motor speed is abnormal, the controller is configured to determine whether a difference value between a value obtained by dividing the maximum difference value between the model speed and the motor speed by the reduction in the motor speed and a determination reference value is greater than or equal to a control reference value, and
    wherein, upon determining that the difference value is greater than or equal to the control reference value, the controller is configured to:
        control the first calculator and the second calculator to calculate the control model speed and the anti-jerk torque control factor, and
        correct the anti-jerk torque based on the calculated control model speed and the calculated anti-jerk torque control factor.

7. The motor torque control apparatus according to claim 6, wherein the control model speed is a value obtained by adding variation in the motor speed, which is decreased to a negative (−) value, to the model speed, and
    wherein the anti-jerk torque control factor is a factor value having the maximum difference value between the model speed and the motor speed and the reduction in the motor speed as input values.

8. The motor torque control apparatus according to claim 6, wherein, when correcting the anti-jerk torque, the controller is configured to:
correct the anti-jerk torque such that the anti-jerk torque is decreased by multiplying a gain value used to calculate the anti-jerk torque by a difference value between the model speed and the motor speed and the anti-jerk torque control factor, and
correct the anti-jerk torque such that the anti-jerk torque is decreased based on a vibration component value, the vibration component value being calculated based on a difference value between the calculated control model speed and the motor speed.

9. The motor torque control apparatus according to claim 6, wherein, upon determining that the difference value is less than the control reference value, the controller is configured to:
control the second calculator to calculate the anti-jerk torque control factor, and
correct the anti-jerk torque based on the calculated anti-jerk torque control factor.

10. The motor torque control apparatus according to claim 9, wherein, when correcting the anti-jerk torque, the controller is configured to correct the anti-jerk torque such that the anti-jerk torque is decreased by multiplying a gain value used to calculate the anti-jerk torque by a difference value between the model speed and the motor speed and the anti-jerk torque control factor.

11. The motor torque control apparatus according to claim 1, wherein, when correcting the anti-jerk torque, and when the control model speed and the anti-jerk torque control factor are calculated, the controller is configured to determine whether normal transition conditions are satisfied,
wherein, upon determining that the normal transition conditions are satisfied, the controller is configured to:
output an existing anti-jerk torque by setting the anti-jerk torque control factor to 1, and
transition from the control model speed to an existing model speed at a constant rate, and
wherein, when variation in the motor speed is greater than a reference speed during the transition, the controller is configured to:
calculate a vibration component in a state of maintaining the transitioned model speed at a constant value, and
output an anti-jerk torque based thereon.

12. The motor torque control apparatus according to claim 11, wherein, when determining whether the normal transition conditions are satisfied, and when none of a first condition pertaining to OFF of an accelerator pedal sensor (APS), a second condition pertaining to lock-up of an engine clutch, and a third condition pertaining to the LFU shifting is satisfied, the controller is configured to determine that the normal transition conditions are satisfied.

13. A motor torque control method of a motor torque control apparatus for a hybrid vehicle, where the motor torque control apparatus comprises a calculator configured to calculate a model speed of a motor, a control model speed, an anti-jerk torque, and an anti-jerk torque control factor, and a controller configured to control the calculator, the motor torque control method comprising:
determining, by the controller, whether lift-foot-up (LFU) shifting is to be performed;
upon determining that the LFU shifting is to be performed, determining, by the controller, whether a motor speed is higher than the model speed;
upon determining that the motor speed is higher than the model speed, controlling, by the controller, the motor speed using the anti-jerk torque;
controlling, by the controller, the calculator to calculate a maximum difference value between the model speed and the motor speed and a reduction in the motor speed;
determining, by the controller, whether the motor speed is abnormal based on the maximum difference value between the model speed and the motor speed and the reduction in the motor speed;
upon determining that the motor speed is abnormal, controlling, by the controller, the calculator to calculate the control model speed and the anti-jerk torque control factor;
correcting, by the controller, the anti-jerk torque based on the control model speed and the anti-jerk torque control factor; and
controlling, by the controller, the motor speed using the corrected anti-jerk torque.

14. The motor torque control method according to claim 13, wherein, in controlling the motor speed using the anti-jerk torque, when the motor speed is higher than the model speed, the calculator is controlled to calculate the anti-jerk torque, and the motor speed is controlled using the calculated anti-jerk torque.

15. The motor torque control method according to claim 13, wherein, in determining whether the motor speed is abnormal, determining whether a value obtained by dividing the maximum difference value between the model speed and the motor speed by the reduction in the motor speed is greater than or equal to a determination reference value, and
wherein, when the value obtained by dividing the maximum difference value by the reduction in the motor speed is greater than or equal to the determination reference value, determining that the motor speed is abnormal.

16. The motor torque control method according to claim 13, wherein, in correcting the anti-jerk torque, when the motor speed is abnormal, determining whether a difference value between a value obtained by dividing the maximum difference value between the model speed and the motor speed by the reduction in the motor speed and a determination reference value is greater than or equal to a control reference value, and
wherein, when the difference value is greater than or equal to the control reference value, the control model speed and the anti-jerk torque control factor are calculated, and the anti-jerk torque is corrected based on the calculated control model speed and the calculated anti-jerk torque control factor.

17. The motor torque control method according to claim 16, wherein, in correcting the anti-jerk torque, the anti-jerk torque is corrected such that the anti-jerk torque is decreased by multiplying a gain value used to calculate the anti-jerk torque by a difference value between the model speed and the motor speed and the anti-jerk torque control factor, and
wherein the anti-jerk torque is corrected such that the anti-jerk torque is decreased based on a vibration component value, the vibration component value being calculated based on a difference value between the calculated control model speed and the motor speed.

18. The motor torque control method according to claim 16, wherein, in correcting the anti-jerk torque, when the difference value is less than the control reference value, the anti-jerk torque control factor is calculated, and the anti-jerk torque is corrected such that the anti-jerk torque is decreased by multiplying a gain value used to calculate the anti-jerk torque by a difference value between the model speed and the motor speed and the anti-jerk torque control factor.

19. The motor torque control method according to claim 13, wherein, in correcting the anti-jerk torque, when the control model speed and the anti-jerk torque control factor are calculated, determining whether normal transition conditions are satisfied, wherein, when the normal transition conditions are satisfied, an existing anti-jerk torque is output by setting the anti-jerk torque control factor to 1, and the control model speed is transitioned to an existing model speed at a constant rate, and wherein, when variation in the motor speed is greater than a reference speed during transition, a vibration component is calculated in a state of maintaining the transitioned model speed at a constant value, and an anti-jerk torque is output based thereon.

20. A hybrid vehicle comprising:

a hybrid power source comprising a motor and an engine; and a motor torque control apparatus configured to control a motor torque of the hybrid power source, wherein, at a time of lift-foot-up (LFU) shifting, the motor torque control apparatus controls a motor speed using an anti-jerk torque, determines whether the motor speed controlled using the anti-jerk torque is abnormal based on a maximum difference value between the motor speed and a model speed and a reduction in the motor speed, corrects the anti-jerk torque based on a control model speed and an anti-jerk torque control factor upon determining that the motor speed is abnormal, and controls the motor speed using the corrected anti-jerk torque.

* * * * *